US009462151B2

(12) United States Patent
Yamasaki et al.

(10) Patent No.: US 9,462,151 B2
(45) Date of Patent: Oct. 4, 2016

(54) IMAGE READING DEVICE AND IMAGE FORMING APPARATUS INCLUDING THE SAME

(71) Applicant: KYOCERA Document Solutions Inc., Osaka (JP)

(72) Inventors: Shunsuke Yamasaki, Osaka (JP); Yoshiyuki Asakawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/831,147

(22) Filed: Aug. 20, 2015

(65) Prior Publication Data

US 2016/0065779 A1    Mar. 3, 2016

(30) Foreign Application Priority Data

Aug. 28, 2014  (JP) ................................ 2014-173620

(51) Int. Cl.
*H04N 1/03* (2006.01)
*H04N 1/10* (2006.01)

(52) U.S. Cl.
CPC .................................... *H04N 1/103* (2013.01)

(58) Field of Classification Search
CPC .. B41J 2/1752; B41J 11/007; B41J 11/0085; B41J 11/70; B41J 13/0027; B41J 13/106; B41J 15/02; B41J 15/04; B41J 15/046; B41J 19/00; B41J 29/13; B41J 2/17523; B41J 2/17533; B41J 2/17536
USPC ............... 358/474, 497, 486, 494, 483, 505; 271/10.11, 264, 274, 109, 117, 265.01, 271/273, 9.01, 10.05, 118, 145, 164, 171, 271/226, 258.01, 259, 265.02, 272, 314, 271/9.05, 9.08, 9.11, 9.13; 399/405, 107, 399/221, 363, 365, 367, 378, 381, 385, 45
See application file for complete search history.

(56) References Cited

U.S. PATENT DOCUMENTS

| 6,101,003 A * | 8/2000 | Wu ....................... H04N 1/1017 358/474 |
| 6,671,069 B1 * | 12/2003 | Kurosawa .......... H04N 1/32459 358/1.9 |
| 2005/0243385 A1 * | 11/2005 | Shin ..................... H04N 1/1017 358/496 |
| 2007/0002397 A1 * | 1/2007 | Osakabe .............. H04N 1/1017 358/474 |
| 2007/0047025 A1 * | 3/2007 | Fujioka ................ H04N 1/1013 358/474 |
| 2009/0190190 A1 * | 7/2009 | Yamauchi ............ H04N 1/1017 358/474 |

(Continued)

FOREIGN PATENT DOCUMENTS

JP    2009-164743    7/2009

*Primary Examiner* — Negussie Worku
(74) *Attorney, Agent, or Firm* — Wenderoth, Lind & Ponack, L.L.P.

(57) ABSTRACT

An image reading device includes a contact image sensor that extends in a main scanning direction at a rear surface side of a document table glass and optically reads an image of a document placed on the document table glass, a carriage that holds the contact image sensor, a rail member that extends in a sub-scanning direction and supports the carriage so as to be movable in the sub-scanning direction, and a driving unit that drives the carriage along the rail member. The image reading device includes a shaft arranged at the rear surface side of the document table glass, having a shaft line vertical to the document table glass, and being rotatable around the shaft line, and an eccentric cam eccentrically connected to the shaft and having a peripheral surface abutting an intermediate part of the rail member in the sub-scanning direction.

4 Claims, 13 Drawing Sheets

(56) References Cited

U.S. PATENT DOCUMENTS

| | | | | |
|---|---|---|---|---|
| 2010/0091334 A1* | 4/2010 | Qiao | G03G 15/5062 | 358/3.26 |
| 2010/0165418 A1* | 7/2010 | Yamasaki | H04N 1/00557 | 358/474 |
| 2012/0086991 A1* | 4/2012 | Hara | H04N 1/00559 | 358/497 |
| 2013/0003143 A1* | 1/2013 | Yamasaki | H04N 1/1013 | 358/475 |
| 2014/0009800 A1* | 1/2014 | Yoshida | H04N 1/1039 | 358/497 |
| 2014/0198356 A1* | 7/2014 | Yamasaki | H04N 1/1017 | 358/484 |
| 2014/0198357 A1* | 7/2014 | Shibata | H04N 1/00559 | 358/484 |
| 2014/0376067 A1* | 12/2014 | Yamasaki | H04N 1/1039 | 358/497 |
| 2015/0264207 A1* | 9/2015 | Kitaichi | H04N 1/00798 | 358/434 |
| 2015/0341519 A1* | 11/2015 | Yamasaki | H04N 1/0249 | 358/497 |
| 2016/0065768 A1* | 3/2016 | Yamasaki | H04N 1/00557 | 358/474 |

* cited by examiner

| One side | Main scanning direction | Other side |
| Front side | Front and rear direction | Rear side |

Fig.13

| One side | Main scanning direction | Other side |
| Front side | Front and rear direction | Rear side |

Fig.14

IMAGE READING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-173620 filed on Aug. 28, 2014, the entire contents of which are incorporated herein by reference.

BACKGROUND

The technology of the present disclosure relates to an image reading device and an image forming apparatus including the same.

Conventionally, there has been known an image reading device which reads an image of a document on a contact glass by a contact image sensor configured to be movable in a sub-scanning direction. The contact image sensor has a rectangular box-shaped housing long in a main scanning direction, and a line sensor and a light source accommodated in the housing. The contact image sensor is supported by a carriage, which is movable in the sub-scanning direction, from below. An urging spring is provided between the contact image sensor and the carriage, wherein the contact image sensor is pressed to the contact glass by the urging spring. The carriage is supported by one rail member so as to be movable in the sub-scanning direction. The rail member is configured with a shaft member extending in the sub-scanning direction and supports a center part of the carriage in the main scanning direction from below.

SUMMARY

An image reading device according to one aspect of the present disclosure includes a contact image sensor, a carriage, a rail member, and a driving unit. The contact image sensor extends in a main scanning direction at a rear surface side of a document table glass. Furthermore, the contact image sensor optically reads an image of a document placed on the document table glass. The carriage holds the contact image sensor. The rail member extends in a sub-scanning direction. Furthermore, the rail member supports the carriage so as to be movable in the sub-scanning direction. The driving unit drives the carriage along the rail member.

Furthermore, the aforementioned image reading device further includes a shaft and an eccentric cam. The shaft is arranged at the rear surface side of the aforementioned document table glass. The shaft has a shaft line vertical to the document table glass and is configured to be rotatable around the shaft line. The eccentric cam is eccentrically connected to the aforementioned shaft. Furthermore, the eccentric cam has a peripheral surface abutting an intermediate part of the aforementioned rail member in the sub-scanning direction.

DETAILED DESCRIPTION

Embodiment

Figure 1:
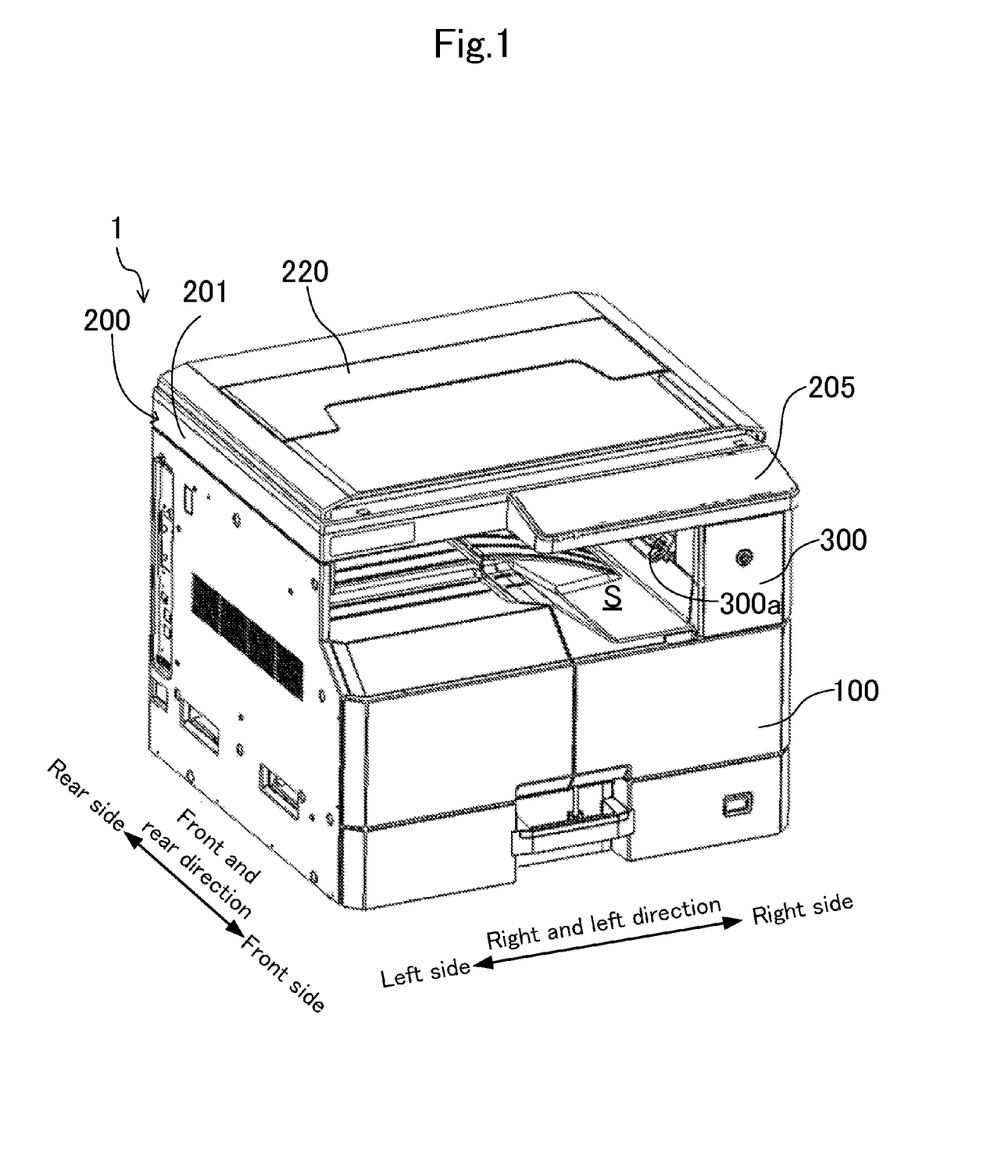
FIG. 1 is a perspective view of an image forming apparatus including an image reading device in an embodiment.
Figure 2:
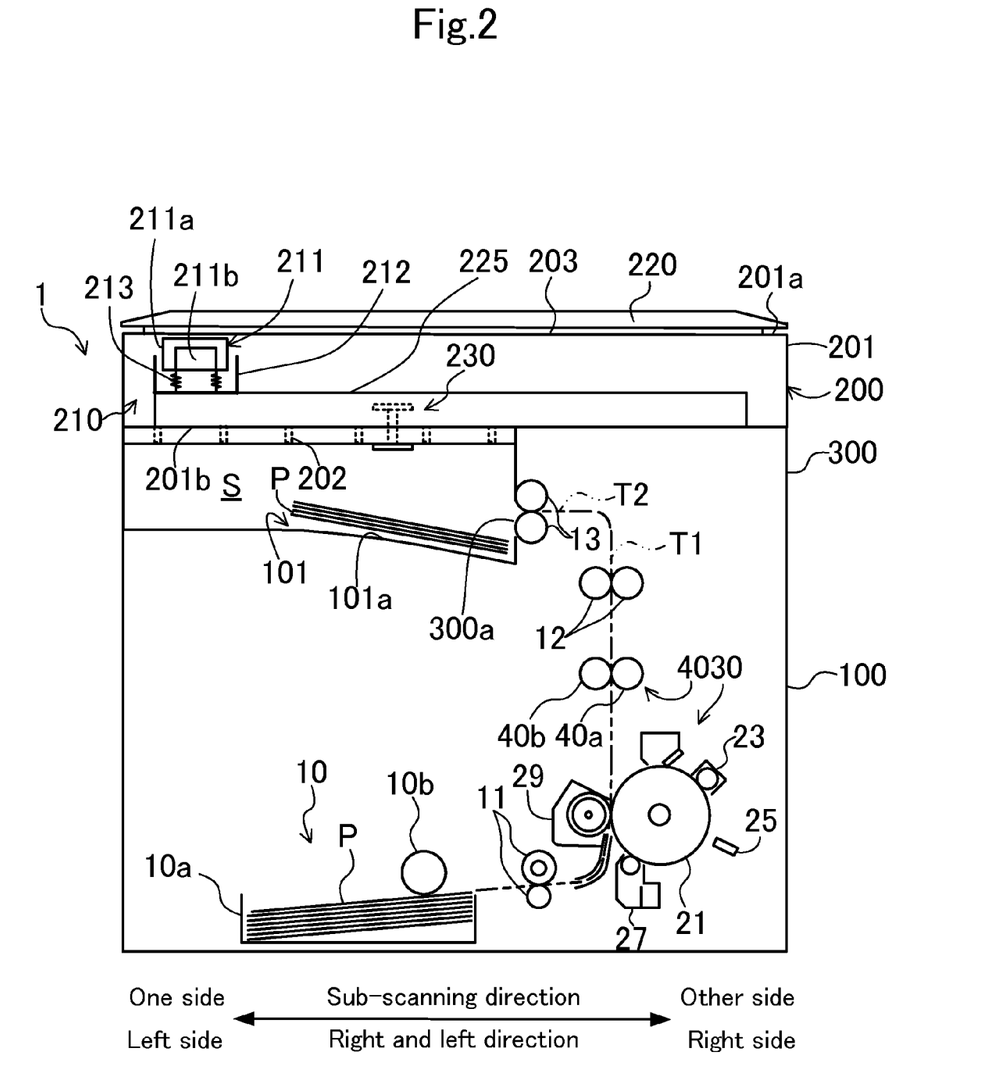
FIG. 2 is a schematic diagram illustrating an internal structure of an image forming apparatus.

FIG. 1 and FIG. 2 illustrate an image forming apparatus 1 including an image reading device 200 of the present embodiment. The image forming apparatus 1 is a so-called in-body paper discharge type copy machine and has an image forming apparatus body 100, the image reading device 200, and a support housing 300. The image reading device 200 reads a document image and acquires image data thereof. The image forming apparatus body 100 has an image forming unit 30 for printing the image data acquired by the image reading device 200 on a paper P therein. The image reading device 200 is supported at an upper side of the image forming apparatus body 100 via the support housing 300. A paper discharge space S is formed between the image forming apparatus body 100 and the image reading device 200.

The aforementioned image reading device 200 has an approximately rectangular parallelepiped-shaped housing 201 for accommodating an image reading unit 210 therein. The housing 201 is provided at a lateral side thereof with an operation panel 205 used when a user performs various operation instructions with respect to the image forming apparatus 1 (see FIG. 1). In the following description, a side at which the operation panel 205 is positioned in the image forming apparatus 1 is defined as a "front side" and an opposite side thereof is defined as a "rear side". Furthermore, a left side when the image forming apparatus 1 is viewed from the front side is defined as a "left side" and a right side is defined as a "right side".

Figure 3:
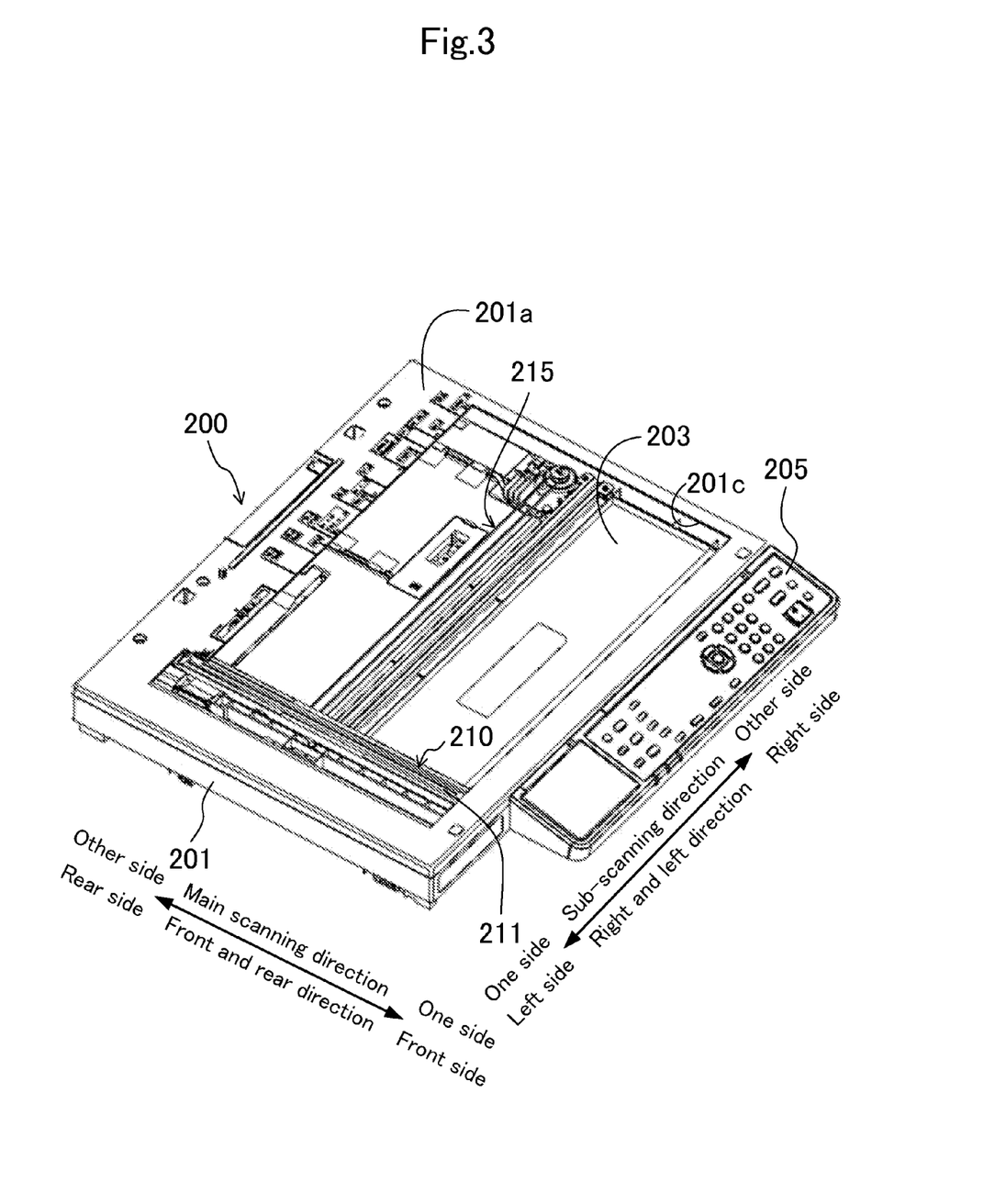
FIG. 3 is a perspective view illustrating an image reading device.

An upper surface 201a of the aforementioned housing 201 is formed with an approximately rectangular opening 201c, and a contact glass (a document table glass) 203 (see FIG. 3) is fitted into the opening 201c. A document cover 220 is supported at an end edge portion of the rear side of the upper surface 201a of the housing 201 so as to be freely openable and closable via a hinge part (not illustrated). In a close state, the document cover 220 presses a document G placed on the contact glass 203 from an upper side and fixes the document G.

The aforementioned image reading unit 210 is arranged at a rear surface side (an opposite side of a document placing surface side) of the contact glass 203. The image reading unit 210 optically reads the document G placed on the contact glass 203 to generate image data thereof and stores the image data in a memory. Details of the image reading unit 210 will be described later.

The aforementioned image forming unit 30 is arranged near a right side wall portion at a lower portion of the image forming apparatus body 100. A paper feeding unit 10 is provided at a left side of the image forming unit 30 and a fixing unit 40 is provided above the image forming unit 30. The paper feeding unit 10 has a paper feeding cassette 10a in which a sheet-shaped paper P is accommodated, and a pick-up roller 10b for taking out the paper P in the paper feeding cassette 10a and sending the paper P to an exterior of the paper feeding cassette 10a. The paper P sent to the exterior of the cassette by the paper feeding cassette 10a is supplied to the image forming unit 30 via a conveying roller pair 11.

The image forming unit 30 has a photosensitive drum 21, a charging device 23, an exposure device 25, a developing device 27, and a transfer device 29. In the fixing unit 40, the paper P is pressed between a fixing roller 40a and a pressing roller 40b, so that a toner image is thermally fixed to the paper P. Then, the paper P is led to the paper discharge space S by a conveying roller pair 12 and 13.

Figure 4:
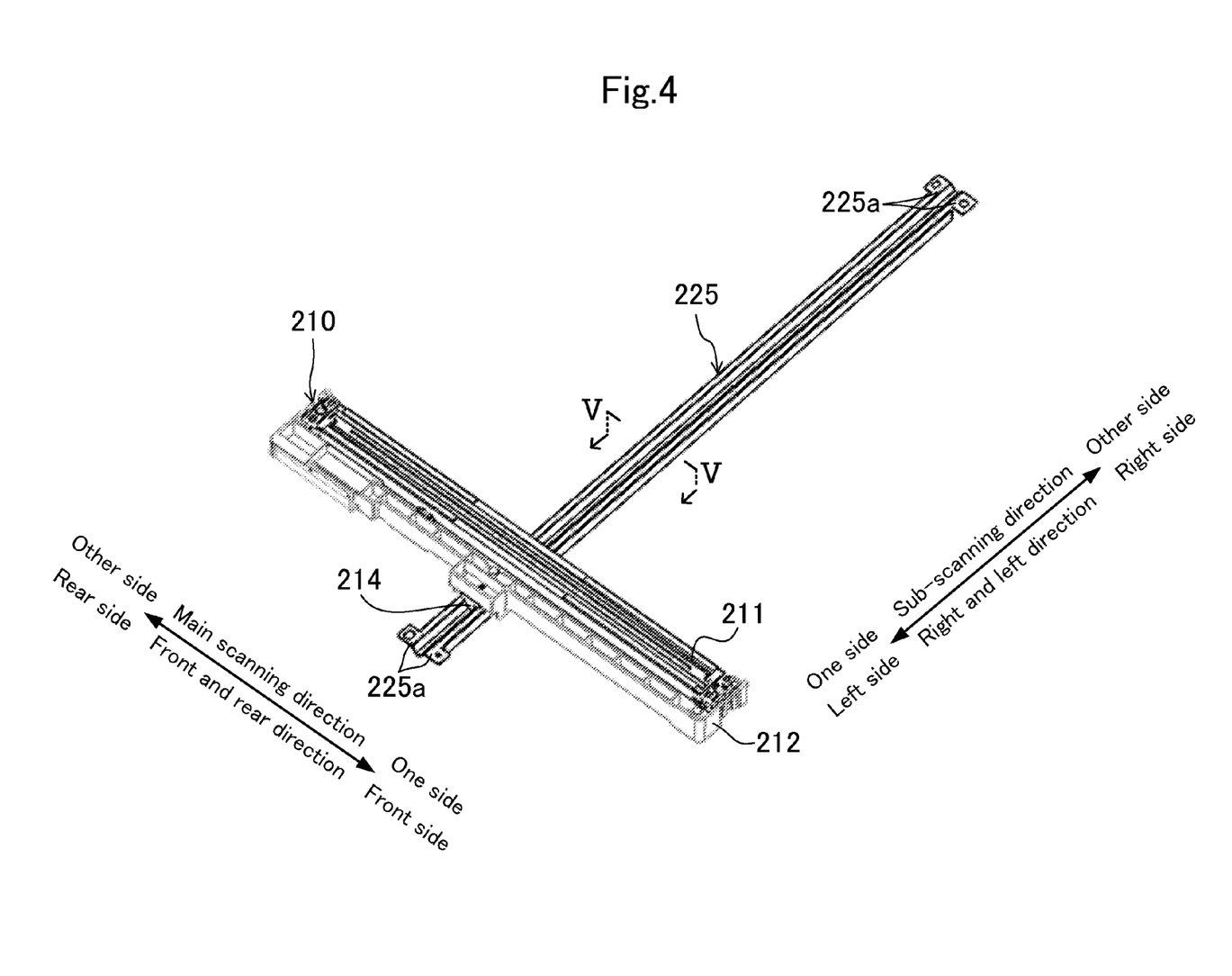
FIG. 4 is a perspective view illustrating a carriage having hold a contact image sensor and a rail member that supports the carriage so as to be movable in a sub-scanning direction.

As illustrated in FIG. 2 and FIG. 4, the aforementioned image reading unit 210 has a contact image sensor (CIS) 211 and a carriage 212 that holds the contact image sensor 211.

The contact image sensor 211 has a box-shaped sensor housing 211a (see FIG. 2) extending in a main scanning direction. The sensor housing 211a accommodates optical elements (not illustrated) of a line sensor, a lens, a light source and the like therein.

Figure 5:
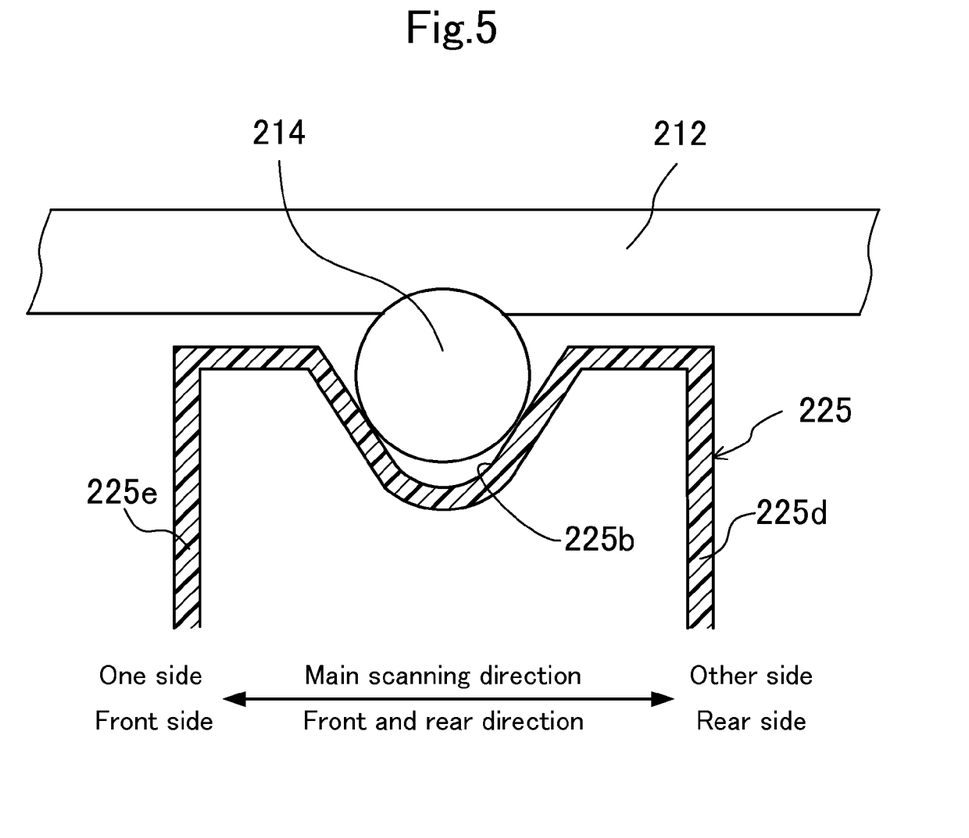
FIG. 5 is a sectional view taken along line V-V of FIG. 4.

The carriage 212 is formed in a box shape which extends in the main scanning direction and is opened upward. The contact image sensor 211 is elastically supported to the carriage 212 via an urging spring 213. The contact image sensor 211 is pressed to the rear surface of the contact glass 203 by urging force of the urging spring 213. As illustrated in FIG. 5, a shaft 214 is fixed to a center part of the main scanning direction in a lower surface of the carriage 212. The shaft 214 extends in a sub-scanning direction and the carriage 212 is supported to a rail member 225 via the shaft 214 from below.

The rail member 225 is configured by a columnar body extending in the sub-scanning direction. A section of the rail member 225 vertical to the sub-scanning direction is an open section obtained by opening a part of a closed section. In the present embodiment, the section of the rail member 225 is formed in an approximately M shape. In other words, the rail member 225 forms an approximately triangular prismatic groove portion 225b extending in the sub-scanning direction on an upper surface of the columnar body having a C sectional shape opened downward. A peripheral surface of the shaft 214 fixed to the carriage 212 abuts two facing inclined surfaces of the groove portion 225b. In this way, the carriage 212 is configured to allow the shaft 214 to be engaged with the groove portion 225b and thereby to be movable along the rail member 225 in the sub-scanning direction.

The aforementioned rail member 225 is formed by bending a sheet metal in the present embodiment. At both end portions of the rail member 225 in the sub-scanning direction (a longitudinal direction), a pair of bracket portions 225a (see FIG. 4) is respectively formed. The rail member 225 is fixed to the housing 201 by bolts (not illustrated) passing through each bracket portion 225a. The rail member 225 is provided at a lateral side thereof with a driving unit 215 (see FIG. 3) for driving the carriage 212.

Figure 6:
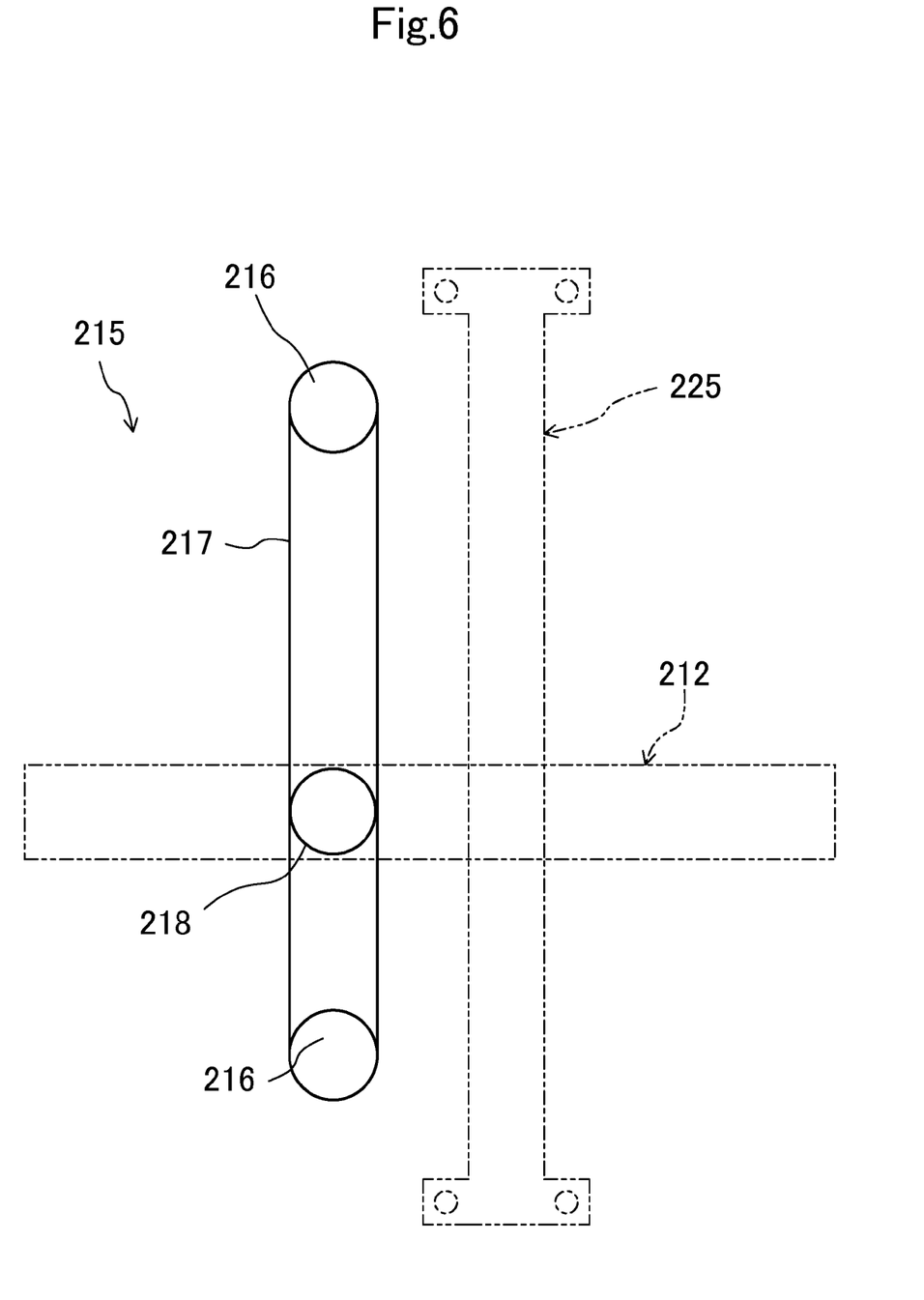
FIG. 6 is a schematic plan view illustrating a driving mechanism that drives a carriage.

As illustrated in FIG. 6, the driving unit 215 has a pair of fixed pulleys 216, a driving belt 217, and a movable pulley 218. On the inner peripheral surface of the driving belt 217, a plurality of tooth parts are formed with a predetermined pitch in a circumferential direction. The movable pulley 218 is mounted at the carriage 212 and a plurality of tooth parts are formed on the outer peripheral surface of the movable pulley 218 to be engaged with the tooth parts of the inner peripheral surface of the driving belt 217. Furthermore, the fixed pulleys 216 are configured to be rotationally driven by a motor (not illustrated), so that the belt 217 rotates and thus the movable pulley 218 moves along the rail member 225 together with the carriage 212.

At the time of image reading, the carriage 212 is driven by the driving unit 215 from one side to the other side of the sub-scanning direction by employing a predetermined initial position as a start point, and stops at a terminating position. In this way, while the carriage 212 is moving from the initial position to the terminating position, image data of a document is acquired by the contact image sensor 211 at each scanning position. The image data of the document acquired by the contact image sensor 211 at each scanning position is transmitted to an image processing circuit (not illustrated). The image processing circuit synthesizes the image data to generate image data of an entire document, and stores the generated image data in a memory.

Figure 7:
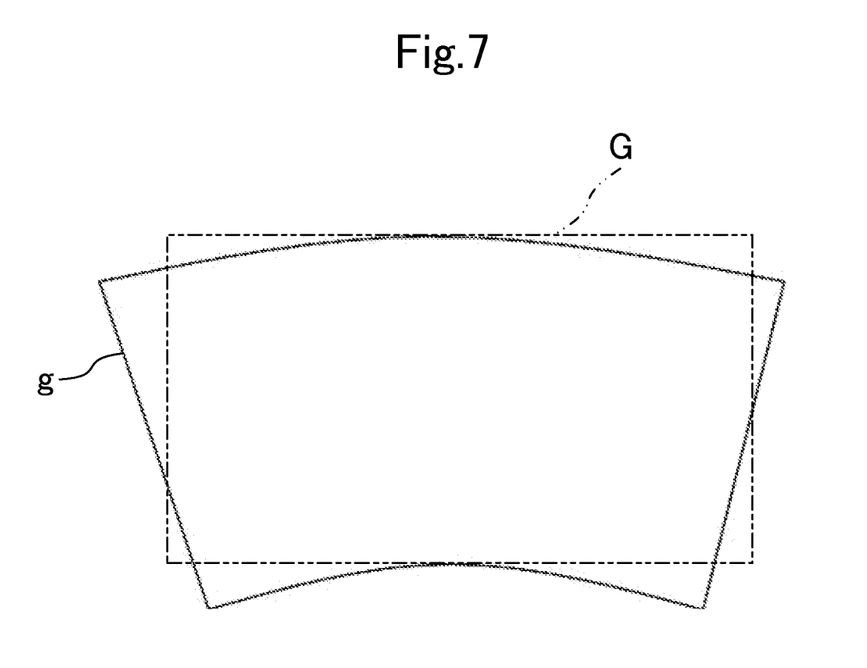
FIG. 7 is an explanation diagram for explaining image distortion occurring in a read image.

Here, for example, when the processing accuracy of the rail member 225 is poor, an intermediate part of the rail member 225 in the sub-scanning direction is curved to one side in the main scanning direction with respect to both end portions of the rail member 225. As a consequence, as illustrated in FIG. 7, there is a problem that read image data g by the contact image sensor 211 is distorted in a fan shape as compared with read image data G when the rail member 225 is not curved. In the present embodiment, in order to prevent such a problem, it is configured to provide a straightness adjustment mechanism 230 for adjusting straightness (straightness when viewed from a direction vertical to the contact glass 203) of the rail member 225.

Figure 8:
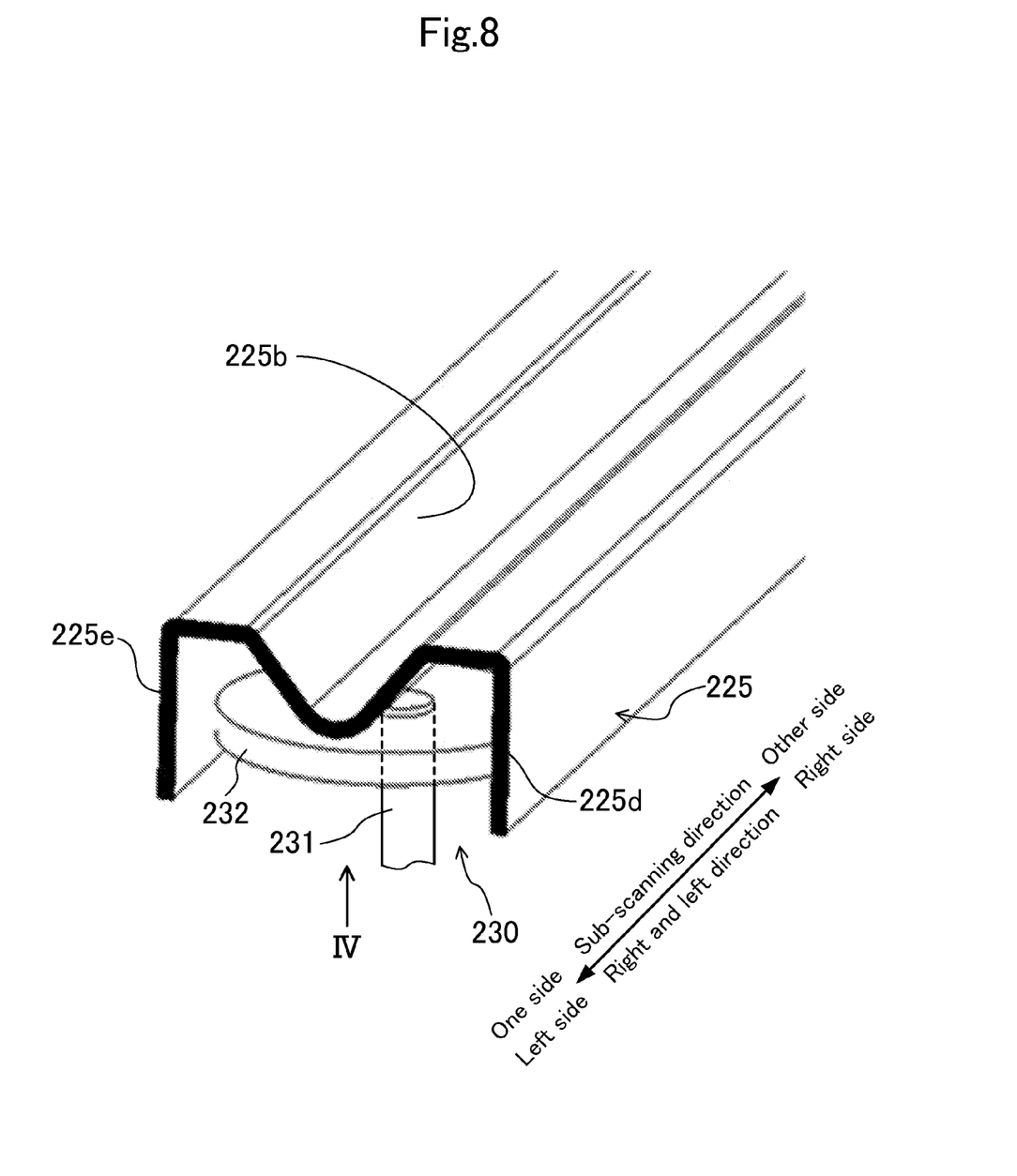
FIG. 8 is a perspective view illustrating an eccentric cam which can be seen inside a rail member when a central vicinity of a rail member in a sub-scanning direction has been cut.
Figure 9:
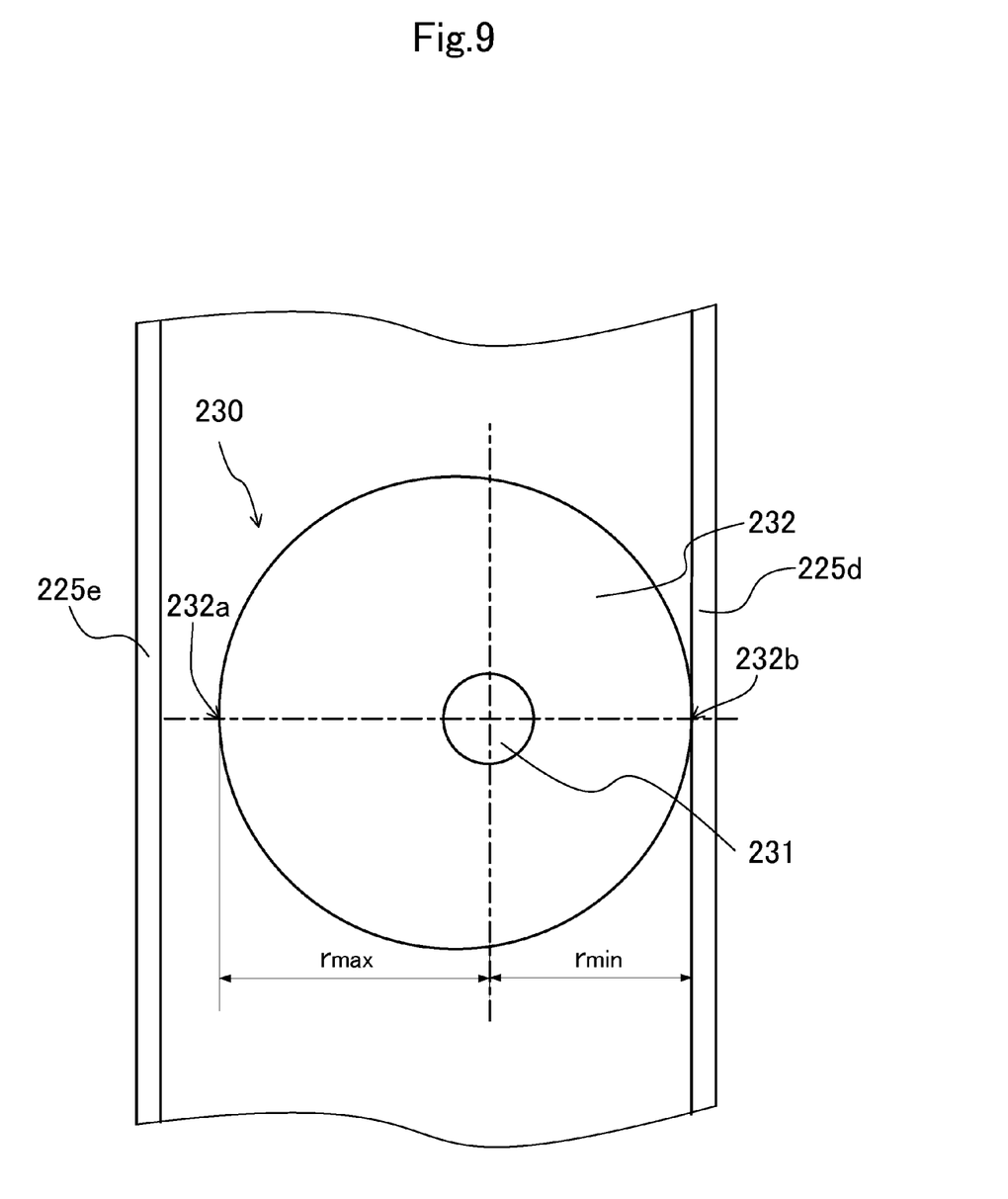
FIG. 9 is a view viewed in the arrow direction of IV of FIG. 8.

As illustrated in FIG. 8 and FIG. 9, when viewed from an upper side, the straightness adjustment mechanism 230 is arranged at the center part of the rail member 225 in the sub-scanning direction. The straightness adjustment mechanism 230 has a shaft 231 and an eccentric cam 232. The shaft 231 has a shaft line vertical to the contact glass 203. The shaft 231 passes through a through hole (not illustrated) formed in a bottom wall 201b of the housing 201. The through hole serves as a bearing that supports the shaft 231 so as to be rotatable. The shaft 231, for example, is wrapped with a C ring, and the C ring abuts the bottom wall 201b, so that the shaft 231 is prevented from falling off downwardly.

The aforementioned eccentric cam 232 is formed in a disc shape and is fixed to an upper end portion (one end portion) of the shaft 231. The eccentric cam 232 is eccentric radially to the shaft 231 (see FIG. 9). In this way, the eccentric cam 232 has a maximum diameter part 232a having a maximum distance to the shaft line of the shaft 231 and a minimum diameter part 232b having a minimum distance to the shaft line of the shaft 231. The eccentric cam 232 is arranged at a center part of the sub-scanning direction within an inner space of the rail member 225. A peripheral surface of the eccentric cam 232 abuts one facing wall 225d of two facing walls 225d and 225e of the rail member 225, which face each other in the main scanning direction. In detail, the peripheral surface of the eccentric cam 232 abuts a center part of the one facing wall 225d in the sub-scanning direction from an inner side thereof.

Figure 10:
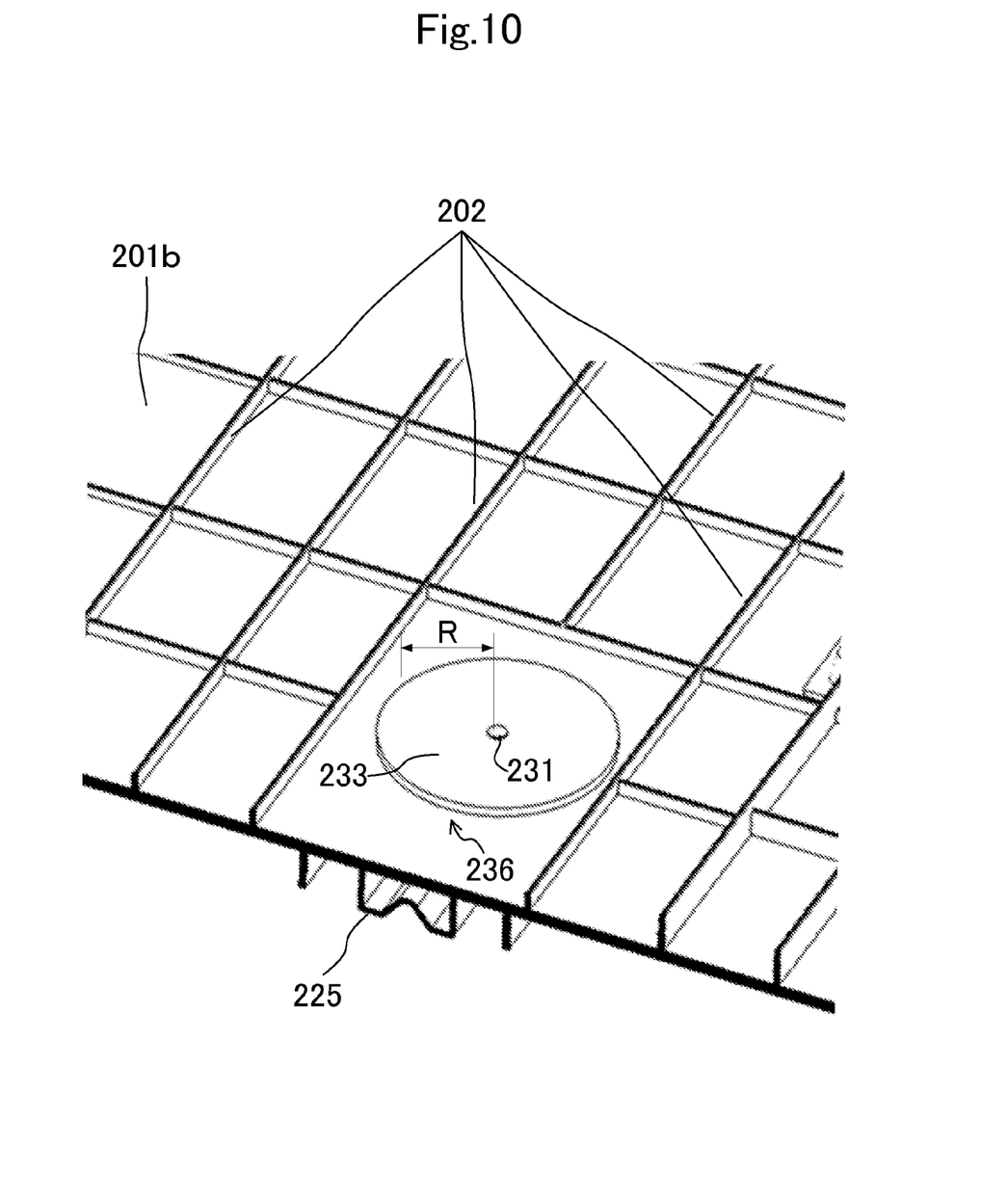
FIG. 10 is a cut model of a bottom wall portion of an image reading device, and illustrates an appearance when an operating unit fixed to the other end portion of a shaft passing through a housing is viewed from a lower side of the housing.

As illustrated in FIG. 10, the other end portion of the shaft 231 protrudes outward from the bottom wall 201b of the housing 201. A handle 233 (corresponding to an operating unit) serving as an operating unit is fixed to the protruding part of the shaft 231. The handle 233 is formed in a disc shape and is fixed coaxially with the shaft 231. A rotation radius R about the shaft 231 (the shaft line of the shaft 231) of the handle 233 is larger than a maximum rotation radius rmax (see FIG. 9) of the eccentric cam 232. Instead of the handle 233, a rod-shaped lever member may also be used.

In the image reading device 200 of the aforementioned embodiment, when the shaft 231 is rotated, the eccentric cam 232 rotates, resulting in a change in a distance from an axial position of the shaft 231 to an abutting position between the peripheral surface of the eccentric cam 232 and the rail member 225. Consequently, a user operates the handle 233 to adjust a rotation angle of the shaft 231 and adjusts a contact state between the peripheral surface of the eccentric cam 232 and the rail member 225, so that it is possible to easily adjust the straightness of the rail member 225. At the time of the adjustment of the straightness, it is sufficient if a bolt for fixing the rail member 225 is loosened, and then is tightened after the straightness adjustment of the rail member 225 by the eccentric cam 232 is ended.

In the aforementioned embodiment, since the rail member 225 is formed by bending a sheet metal member, distortion at the time of processing of the rail member 225 is larger and the straightness of the rail member 225 is worse as compared with the case in which the rail member 225 has been formed through casting or cutting. Thus, the aforementioned straightness adjustment mechanism 230 is particularly useful.

In the aforementioned embodiment, the rail member 225 has an open section obtained by opening a part of a closed section and the eccentric cam 232 is accommodated in the inner space of the rail member 225.

According to the configuration, since the eccentric cam 232 is configured to be accommodated in the inner space (a dead space) of the rail member 225, it is not necessary to separately ensure an arrangement space for arranging the eccentric cam 232. Thus, it is possible to improve space efficiency and thereby to achieve compactification of an entire size of the image reading device 200.

Furthermore, in the aforementioned embodiment, the other end portion of the shaft 231 protrudes to an exterior of the housing 201 and the aforementioned handle 233 is fixed to the protruding part of the shaft 231.

According to the configuration, a user can operate the handle 233 from the exterior of the housing 201, thereby easily rotating the eccentric cam 232. Consequently, when adjusting the straightness of the rail member 225, a user does not need to disassemble the image reading device 200 and puts his/her hands into the housing 201. Thus, it is possible to easily perform the adjustment work.

Furthermore, in the aforementioned embodiment, the rotation radius R about the shaft line of the shaft 231 of the aforementioned handle 233 is larger than the maximum rotation radius rmax about the shaft line of the eccentric cam 232.

Consequently, a user can apply large operating torque to the eccentric cam 232 with slight force. Thus, it is possible to easily rotate the eccentric cam 232 against reaction force from the rail member 225. Accordingly, it is possible to easily and accurately adjust the straightness of the rail member 225.

Embodiment 2

Figure 11:
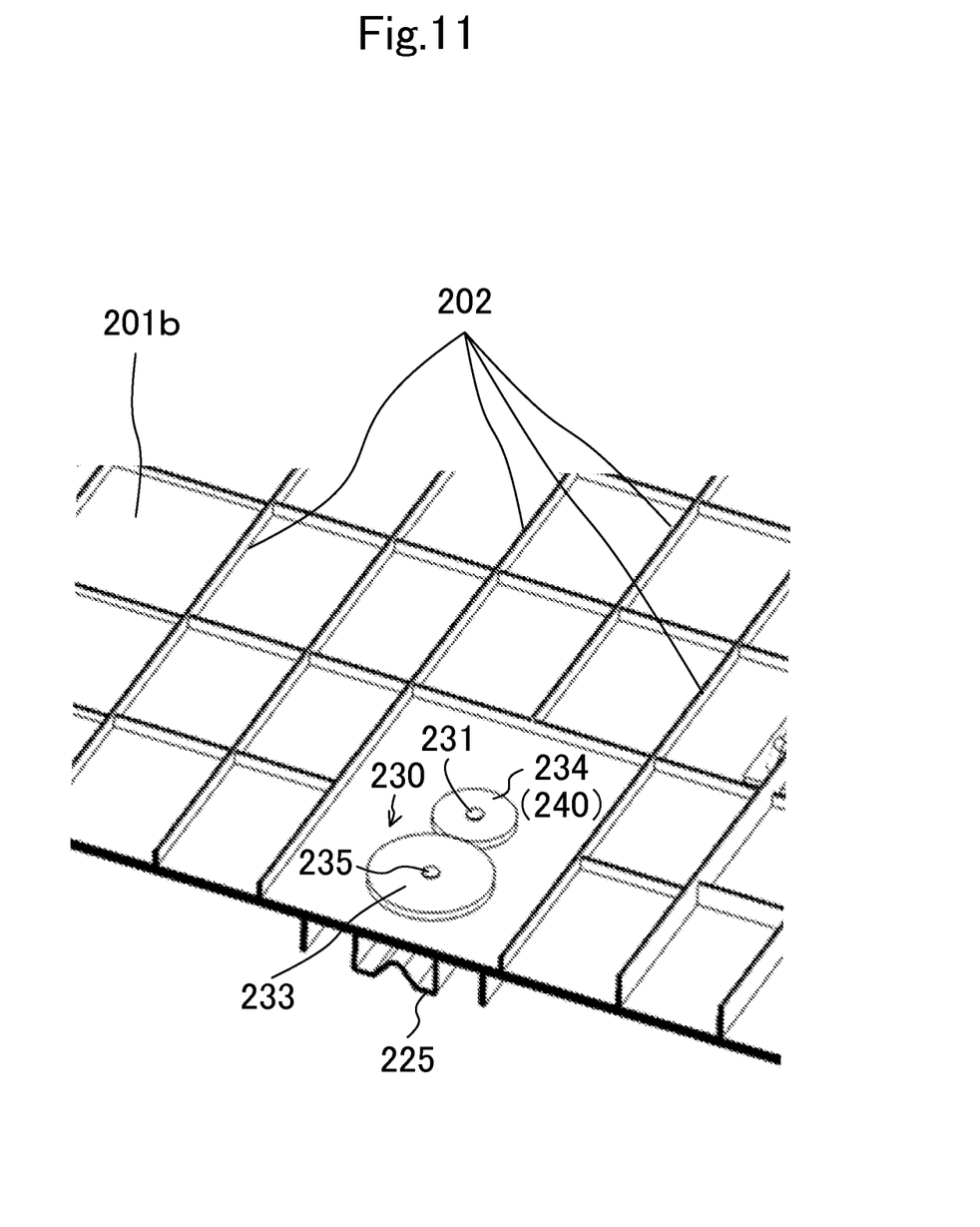
FIG. 11 is a view corresponding to FIG. 10, which illustrates an embodiment 2.

FIG. 11 illustrates an embodiment 2. This embodiment is different from the aforementioned embodiment 1 in terms of a connection structure of the handle 233 to the shaft 231. The same reference numerals are used to designate the same elements as those of FIG. 10, a description thereof will be omitted.

That is, in the present embodiment, a gear 234 (a gear mechanism 240) is interposed between the other end portion of the shaft 231 and the handle 233. In detail, the gear 234 is fixed to the other end portion of the shaft 231 and the handle 233 is fixed to a separate shaft 235 extending in parallel to the shaft 231. The shaft 235 passes through the bottom wall 201b of the housing 201 so as to be rotatable around a shaft line thereof. A gear part is formed on an outer peripheral surface of the handle 233 across the whole circumference and is engaged with the aforementioned gear 234. In this way, the other end portion of the shaft 231 is connected to the handle 233 via the gear 234.

According to the configuration, as compared with the case in which the handle 233 is directly connected to the shaft 231, since the degree of freedom of arrangement of the handle 233 increases, it is possible to arrange the handle 233 at a position at which the handle 233 is easily operated by a user. Furthermore, a gear ratio of the gear 234 with respect to the gear part of the outer peripheral surface of the handle 233 is adjusted, so that it is possible to easily adjust a ratio of a rotation amount of the eccentric cam 232 with respect to a rotation amount of the handle 233. Accordingly, it is possible to accurately adjust the straightness of the rail member 225.

Other Embodiments

In the aforementioned embodiment, the case in which the straightness of the rail member 225 is adjusted by manually rotating the shaft 231 and the eccentric cam 232 via the handle 233 has been described as an example; however, the present invention is not limited thereto. For example, the degree of distortion of a printed image may also be automatically detected by an image sensor, and the shaft 231 and the eccentric cam 232 may also be automatically rotated based on the detected degree of distortion such that the rail member 225 is straightened. It is sufficient if an electric motor (a driving unit), for example, is used as an actuator for rotating the shaft 231 and the eccentric cam 232. In more detail, a printed image of a document printed by the image forming apparatus 1 is read by the image reading device 200 and the degree of distortion of the read printed image is calculated by a controller (not illustrated). In order to solve the distortion of the aforementioned image, the controller (a driving control unit) rotates the aforementioned shaft 231 by the electric motor (the driving unit) by a predetermined amount in response to the aforementioned calculated degree of distortion of the printed image.

Figure 12:
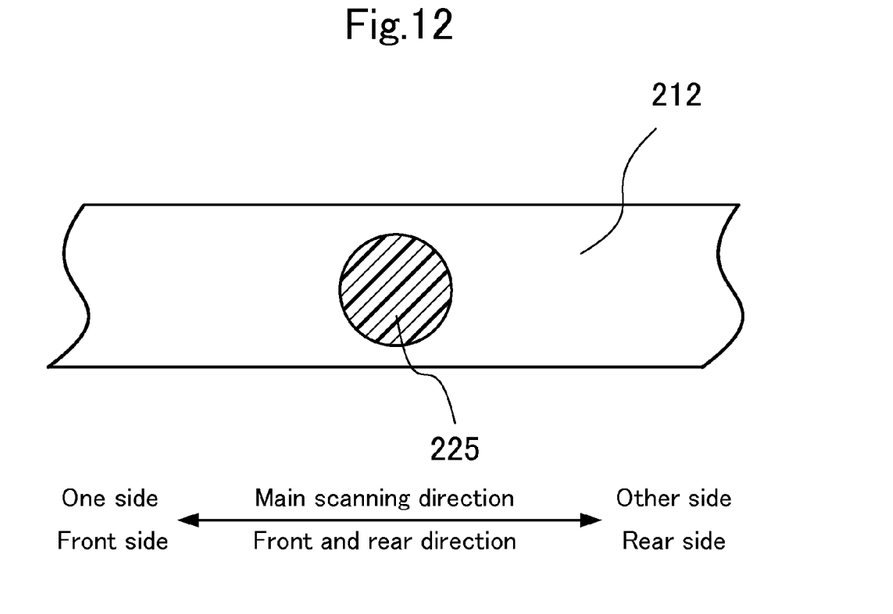
FIG. 12 is a view corresponding to FIG. 5, which illustrates another embodiment.
Figure 13:
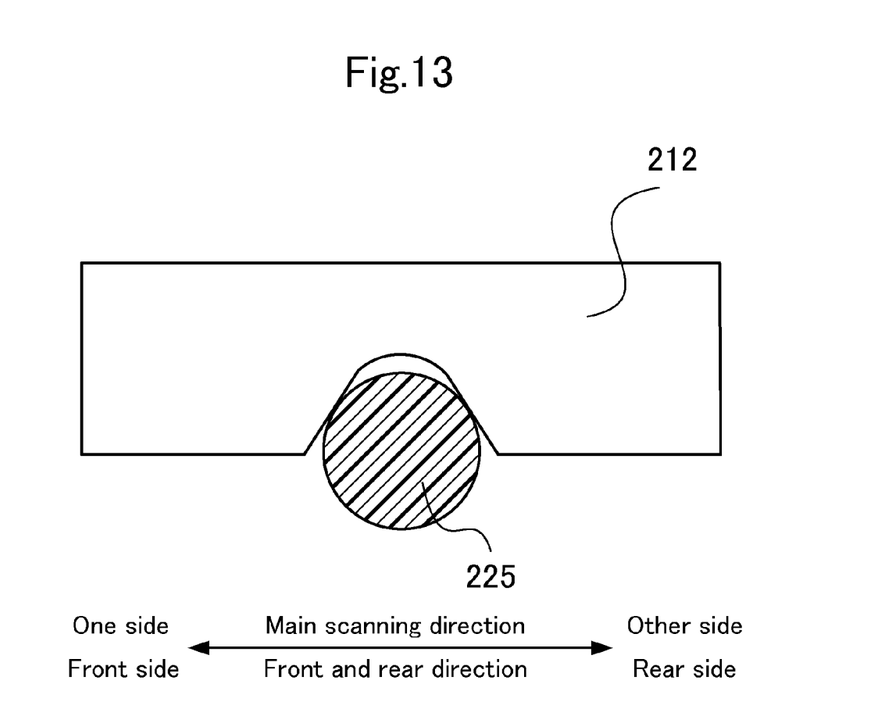
FIG. 13 is a view corresponding to FIG. 5, which illustrates another embodiment.

In the aforementioned embodiment, the sectional shape of the rail member 225 is an open sectional shape obtained by opening a part of a closed section; however, the present invention is not limited thereto, and the rail member 225 may also have a closed sectional shape. Furthermore, as illustrated in FIG. 12 and FIG. 13, the rail member 225, for example, may be a solid shaft. In the example of FIG. 12, a shaft is allowed to pass through the carriage 212, so that the carriage 212 is movable along the rail member 225. In the example of FIG. 13, in contrast to the example of the aforementioned embodiment, a groove portion 212a is formed in the carriage 212 to allow the rail member 225 to serve as a shaft, so that the carriage 212 is movable along the rail member 225.

In the aforementioned embodiment, the straightness adjustment mechanism 230 is provided only to the center part of the rail member 225 in the sub-scanning direction; however, the present invention is not limited thereto, and a plurality of straightness adjustment mechanisms 230 may also be provided. Furthermore, the straightness adjustment mechanism 230 may also be provided at any positions in addition to the center part if they belong to an intermediate part of the rail member 225 in the sub-scanning direction.

Figure 14:
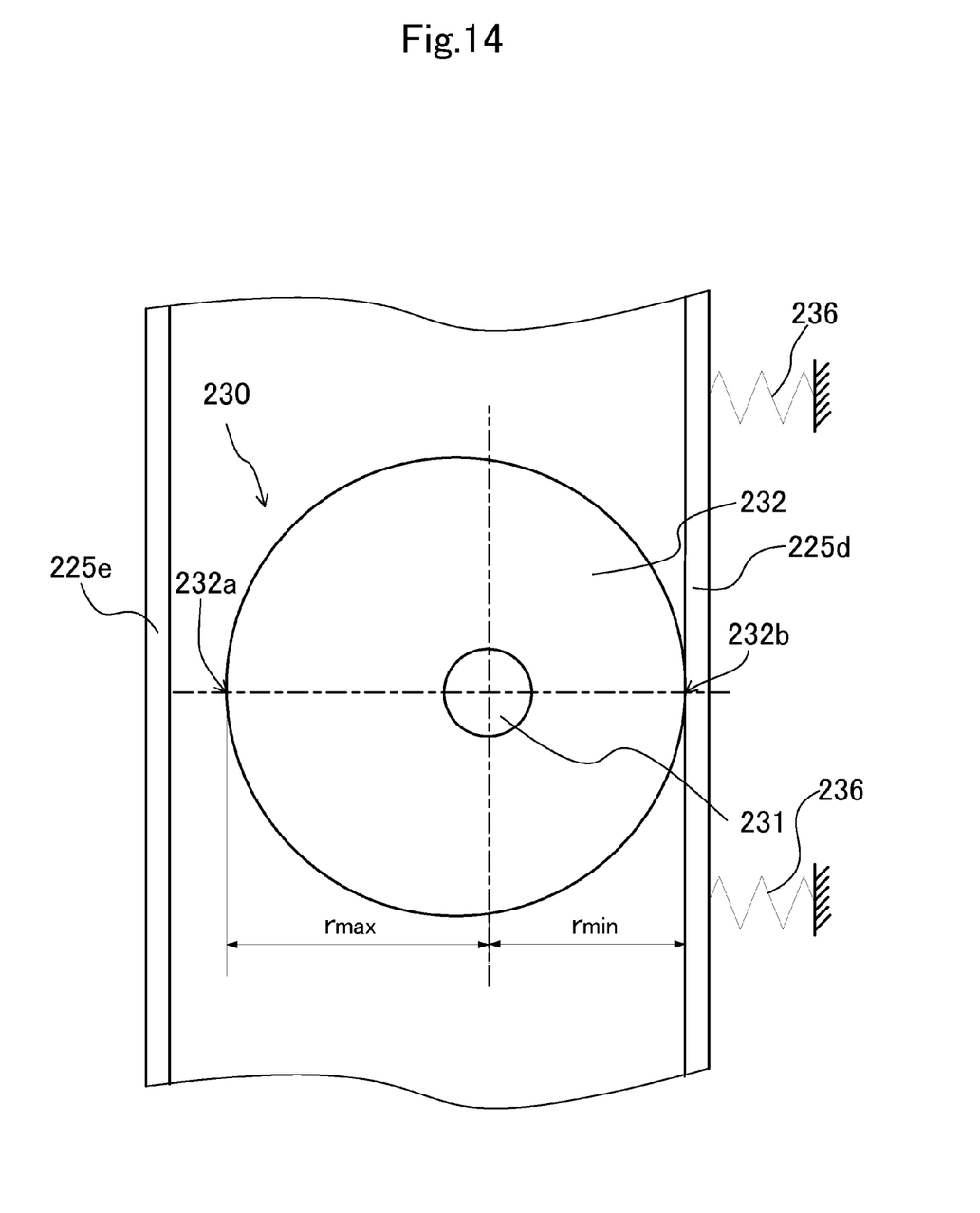
FIG. 14 is a view corresponding to FIG. 9, which illustrates another embodiment.

In the aforementioned embodiment, as illustrated in FIG. 14, the straightness adjustment mechanism 230 may also be provided with an urging member 236 that urges the rail member 225 toward the eccentric cam 232. In this way, it is possible to allow the peripheral surface of the eccentric cam 232 to always abut the facing wall 225d of the rail member 225.

What is claimed is:

1. An image reading device comprising:
a housing having a document table glass on an upper surface thereof;
a contact image sensor that extends in a main scanning direction at a rear surface side of the document table glass and optically reads an image of a document placed on the document table glass;
a carriage that holds the contact image sensor;
a rail member that extends in a sub-scanning direction and supports the carriage so as to be movable in the sub-scanning direction;
a driving unit that drives the carriage along the rail member;
a shaft arranged at the rear surface side of the document table glass, having a shaft line vertical to the document table glass, and being rotatable around the shaft line; and
an eccentric cam eccentrically connected to the shaft and having a peripheral surface abutting an intermediate part of the rail member in the sub-scanning direction, wherein
the carriage, the rail member and the driving unit are accommodated in the housing,
the driving unit has a pair of fixed pulleys, an annular belt, a movable pulley and a motor,
the annular belt is wound around the pair of fixed pulleys and a plurality of tooth parts are formed on an inner peripheral surface of the annular belt,
the movable pulley is mounted on the carriage and a plurality of tooth parts are formed on an outer peripheral surface of the movable pulley to be engaged with the tooth parts of the annular belt,
the motor rotates and drives one of the fixed pulleys,
the driving unit is configured to rotate the annular belt with the fixed pulley so as to move the movable pulley together with the carriage along the rail member,
the rail member is formed by bending a sheet metal,
a section of the rail member vertical to the sub-scanning direction has an M shape opened downward,
the eccentric cam is accommodated in an inner space of the rail member, and has a maximum diameter part having a maximum distance to the shaft line of the shaft and a minimum diameter part having a minimum distance to the shaft line of the shaft, and
the peripheral surface of the eccentric cam abuts one of two facing walls in the main-scanning direction of the rail member.

2. The image reading device of claim 1, wherein
one end portion of the shaft is fixed to the eccentric cam,
the shaft passes through a bottom wall portion of the housing and has a remaining end portion protruding to an exterior of the housing, and
an operating unit is connected to the remaining end portion of the shaft, a rotation radius of the operating unit about the shaft line of the shaft being larger than a maximum rotation radius about a shaft line of the eccentric cam.

3. The image reading device of claim 2, further comprising:
a gear mechanism interposed between the remaining end portion of the shaft and the operating unit,
wherein the remaining end portion of the shaft is connected to the operating unit via the gear mechanism.

4. An image forming apparatus comprising:
the image reading device of claim 1;
a print unit that prints a document image read by the image reading device;
a detection unit that detects a degree of distortion of a printed image of the document printed by the print unit;
a driving unit that drives the shaft; and
a driving control unit that rotates the shaft by the driving unit by a predetermined amount in response to the degree of the distortion of the printed image detected by the detection unit.

* * * * *